United States Patent Office 2,765,677
Patented Oct. 9, 1956

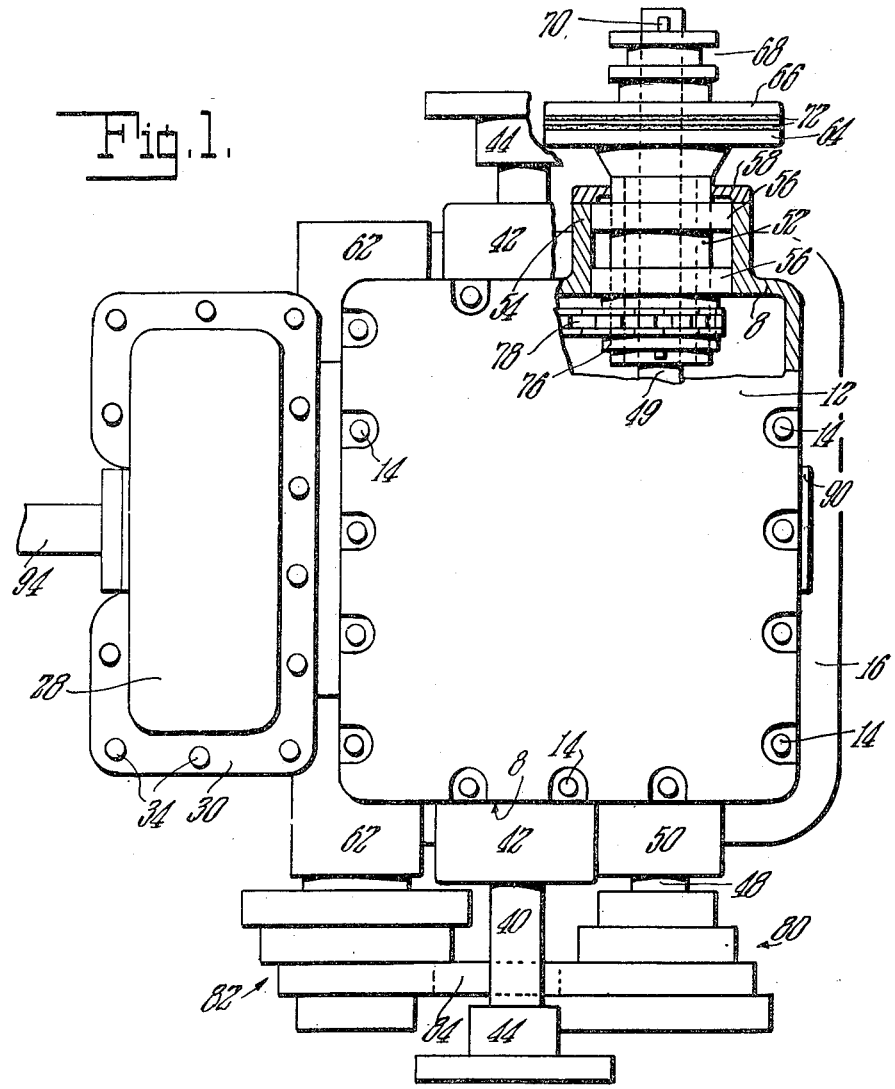

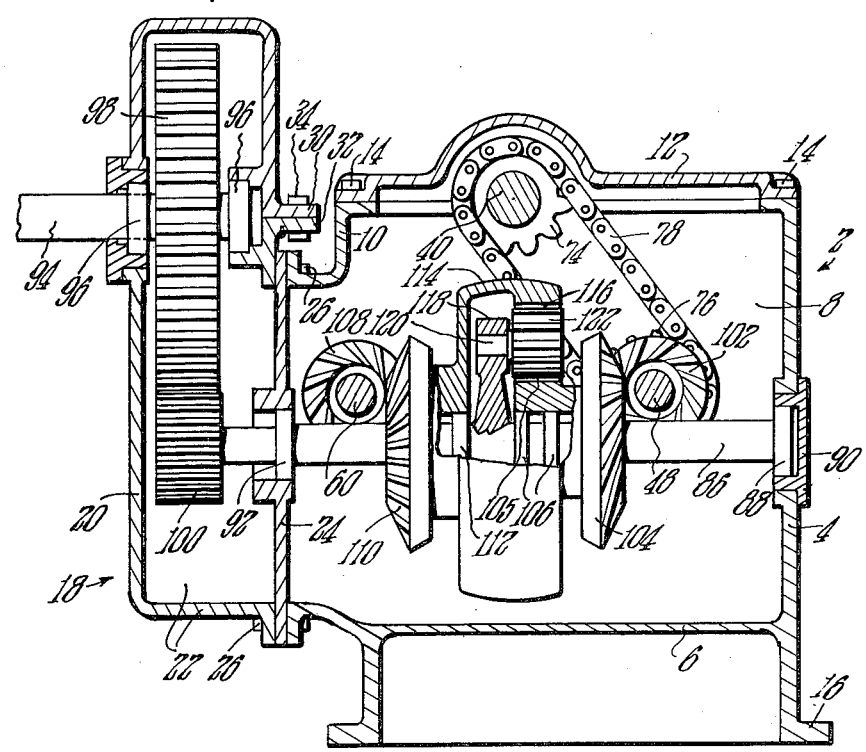

2,765,677
DRIVING MECHANISM
Millard F. Hayes, Hudson Falls, N. Y.

Application July 11, 1952, Serial No. 298,347

1 Claim. (Cl. 74—689)

This invention relates to improvements in drive apparatus.

The principal objects of the invention are directed to the provision of drive apparatus which is adapted for many and various uses but is particularly adapted for use in connection with a machine having a main drive shaft from which various units are driven at predetermined relative speeds.

As an illustration, it is common practice with a paper making machine to drive the various units of the machine from a main drive shaft by belts and pulleys and the like. The different units are driven at various predetermined relative speeds and said speeds must be maintained in their relationship as the speed of the main drive shaft varies.

According to this invention the drive apparatus is arranged with an input shaft and an output shaft so that plural drive units having their input shafts connected may provide power to plural units at different predetermined speeds and should the speed of the input shaft vary the speed relation of the output shafts will be maintained.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a plan view of drive mechanism embodying the novel features of the invention; and Fig. 2 is a sectional elevational view on the line 2—2 of Fig. 1.

Referring now to the drawings more in detail, the invention will be fully described.

A supporting housing 2 is provided which has a front wall 4, a bottom wall 6, end walls 8 and a rear wall 10. A cover 12 is secured to the housing by bolts 14 or the like and a lower marginal flange 16 is provided for securing the housing to a foundation or the like.

A hood 28 has a rear wall 20 and a bottom and side wall 22 and is secured with a partition wall 24 to the rear wall 10 by bolts 26 or the like. A closure 28 has a flange 30 overlying a flange 32 of the hood and is secured thereby by bolts 34.

A main drive shaft 40 extends through the housing and is rotatable in bearings 42 thereof. The said shaft 40 may have half-couplings 44 secured thereto at opposite ends so that said shaft may be coupled to other similar units or power means such as the shaft of a motor.

A primary shaft 48 disposed in parallelism with shaft 40 has one end journalled for rotation in a bearing 50 of the housing. A quill 52 is journalled in a bearing part 54 of the housing by means of anti-friction bearings 56 and a cap 58 is secured to the part 54. An opposite end 49 of the primary shaft 48 is freely rotatable in said quill 52.

A secondary shaft 60 in parallelism with shaft 48 is rotatable in bearings 62 of the housing.

A clutch disc 64 is integral with the quill 52 and a disc member 66 having a collar 68 is reciprocable on shaft end 49 and held against rotation thereon by a key 70. Friction members 72 are disposed between discs 64 and 66 and cooperating with the members 64 and 66 constitute clutch mechanism.

The drive shaft 40 and the quill 52 are positively and operatively connected by sprockets 74 and 76 fixed thereto and a chain 78 engaging said sprockets. Said shaft and quill may be operatively connected by suitable gearing or the like, if desired.

With the drive shaft 40 in operation, the quill 52 is rotated thereby. The clutch mechanism described brings about rotation of the primary shaft when the clutch discs are engaged as is ordinary with clutch mechanisms.

The secondary shaft 60 is driven by the primary shaft 48 through change speed means which may take any desired form. For illustrative purposes, such means includes stepped pulleys 80 and 82 fixed on shafts 48 and 60 and a connecting belt 84 so that shaft 60 may be rotated from shaft 48 at various speeds, and thereby the speed ratio of the input shaft and shaft 60 is variable.

An intermediate shaft 86 has one end journalled for rotation in an anti-friction bearing 88 which is carried by a cap 90 fixed to the forward wall of the housing. The opposite end of said shaft is journalled in an anti-friction bearing 92 carried by partition wall 24.

An output shaft 94 is journalled in anti-friction bearings 96 of the member 28 and has fixed thereto a driven gear 98 which is in mesh with a drive gear 100 fixed to shaft 86.

A drive pinion 102 is fixed on the primary shaft 48 and a driven gear 104 in mesh therewith is freely rotatable on shaft 86 by means of anti-friction bearings 106. Said gear 104 has a set of external teeth 105 therearound.

A drive pinion 108 is fixed on the secondary shaft 60 and is in mesh with a driven gear 110 which is freely rotatable on the shaft 86 by means of anti-friction bearings such as 112. An annular housing 114 is carried by the gear 110 which has a set of internal teeth 116 therearound.

The shaft 86 is provided with arms, such as 118, which are integral therewith and which carry studs 120. Pinions, such as 122, are rotatable on the studs 120 and are in mesh with the gearing 105 and 116 of gears 104 and 110.

The gearing described constitutes what may be called a planetary system and functions for driving the intermediate shaft 86 from the primary and secondary shafts 48 and 60.

With main shaft 40 in operation, the primary shaft 48 is driven thereby accordingly as the clutch mechanism connects shaft 48 to the quill 52.

Various speed ratios of shafts 48 and 60 may be obtained by means of the speed change means.

The gears 104 and 110 are driven by the pinions 102 and 108 so that the shaft 86 is driven through pinions 112 and gearing 105 and 116 at certain speeds related to the speed ratio of the shafts 48 and 60.

Thus by selecting various predetermined speed ratios of the shafts 48 and 60, the output shaft 94 will rotate at certain speeds relative thereto.

By means of the apparatus, a unit may be driven at a predetermined speed relative to the input shaft and with the input shafts of plural driving mechanisms connected together plural units may be driven by the output shafts at various speeds relative to the input shaft.

The housing is constructed and arranged for efficient lubrication of the apparatus the components of which are constructed and arranged to provide a compact powerful structure adapted for many and various uses.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Driving mechanism comprising, a supporting housing, a main driving shaft rotatably journalled in said housing and having opposite ends extending therefrom, separate and relatively spaced primary and secondary shafts journalled in said housing for rotation on parallel axes which are parallel to the axis of said main driving shaft and having end portions extending outside said housing, chain and sprocket connections between said main driving shaft and primary shaft whereby said primary shaft is positively driven by said main driving shaft, a change speed mechanism outside said housing connecting the end portions of said primary and secondary shafts, an intermediate shaft rotatable in said housing on an axis transverse to the axis of said main driving shaft, driven gears freely rotatable on said intermediate shaft, pinions fixed on said primary and secondary shafts in mesh with said driven gears, a casing fixed to one of said driven gears having an internal gear, the other of said driven gears being provided with an external gear fixed thereto and disposed within the internal gear, an arm fixed to said intermediate shaft within said housing having a pinion rotatable thereon in mesh with the internal and external gears whereby said intermediate shaft is driven according to the relative speeds of said primary and secondary shafts, an output shaft journalled in said housing on an axis transverse to said main driving shaft, and operative driving connections between said intermediate and output shafts.

References Cited in the file of this patent

UNITED STATES PATENTS

| | | |
|---|---|---|
| 607,640 | Schneider | July 19, 1898 |
| 805,504 | Trufant | Nov. 28, 1905 |
| 1,708,270 | Henderson | Apr. 9, 1929 |
| 1,814,311 | Harvey | July 14, 1931 |
| 2,161,894 | Bishop | June 13, 1939 |
| 2,175,551 | Perry | Oct. 10, 1939 |
| 2,233,967 | Wellton | Mar. 4, 1941 |
| 2,265,635 | Dietrich et al. | Dec. 9, 1941 |
| 2,392,149 | Hornstobel | Jan. 1, 1946 |
| 2,545,152 | Haidegger | Mar. 13, 1951 |

FOREIGN PATENTS

| | | |
|---|---|---|
| 258,400 | Switzerland | May 2, 1949 |
| 539,362 | France | June 24, 1922 |
| 804,694 | France | Oct. 29, 1936 |